(12) United States Patent
Graeve et al.

(10) Patent No.: US 7,913,800 B2
(45) Date of Patent: Mar. 29, 2011

(54) STEERING SYSTEM WITH VARIABLE FLOW RATE AMPLIFICATION RATIO AND ASSOCIATED METHOD

(75) Inventors: Joshua D. Graeve, Epworth, IA (US); Eric R. Anderson, Galena, IL (US)

(73) Assignee: Deere & Company, Moline, IL (US)

( * ) Notice: Subject to any disclaimer, the term of this patent is extended or adjusted under 35 U.S.C. 154(b) by 932 days.

(21) Appl. No.: 11/589,459

(22) Filed: Oct. 30, 2006

(65) Prior Publication Data

US 2008/0116001 A1    May 22, 2008

(51) Int. Cl.
*B62D 5/06* (2006.01)
(52) U.S. Cl. .................................................... 180/421
(58) Field of Classification Search .............. 180/421, 180/422
See application file for complete search history.

(56) References Cited

U.S. PATENT DOCUMENTS

| | | | |
|---|---|---|---|
| RE25,126 E | 2/1962 | Charlson | |
| 4,385,674 A * | 5/1983 | Presley | 180/402 |
| 4,457,132 A * | 7/1984 | Roberts | 60/384 |
| 4,470,432 A | 9/1984 | Kervagoret | |
| 4,480,971 A | 11/1984 | Swedberg | |
| 4,493,622 A | 1/1985 | Miller | |
| 4,514,152 A | 4/1985 | Takamatsu | |
| 4,531,082 A | 7/1985 | Yoshinada | |
| 4,566,272 A | 1/1986 | Petersen et al. | |
| 4,759,182 A * | 7/1988 | Haarstad | 60/384 |
| 4,781,219 A * | 11/1988 | Haarstad et al. | 137/625.24 |
| 4,809,586 A | 3/1989 | Gage et al. | |
| 4,838,314 A * | 6/1989 | Gage | 137/625.24 |
| 4,862,690 A | 9/1989 | Haarstad | |
| 4,875,542 A | 10/1989 | Uchida et al. | |
| 4,958,493 A | 9/1990 | Schutten et al. | |
| 5,020,618 A | 6/1991 | Nagao | |
| 5,042,250 A | 8/1991 | Carlson | |
| 5,050,696 A | 9/1991 | McGovern et al. | |
| 5,080,135 A | 1/1992 | Stephenson | |
| 5,165,496 A | 11/1992 | Pederson et al. | |
| 5,186,211 A | 2/1993 | Stephenson et al. | |
| 5,186,212 A | 2/1993 | Stephenson et al. | |
| 5,253,729 A | 10/1993 | Suzuki | |
| RE34,746 E | 10/1994 | Schutten et al. | |
| 5,511,457 A * | 4/1996 | Hawkins et al. | 91/6 |
| 5,620,026 A | 4/1997 | Stephenson et al. | |
| 5,634,495 A | 6/1997 | Rasmussen et al. | |
| 5,638,864 A | 6/1997 | Haarstad et al. | |
| 5,819,532 A | 10/1998 | Wang et al. | |
| 5,970,708 A | 10/1999 | Bergmann et al. | |
| 6,076,349 A | 6/2000 | Stephenson et al. | |

(Continued)

FOREIGN PATENT DOCUMENTS

DE    2228531 C2    1/1982

(Continued)

OTHER PUBLICATIONS

Eaton Char-Lynn, steering Catalog, C-STOV-MC001-E Jan. 2003; p. 20, 32 and 34.*

(Continued)

*Primary Examiner* — Joanne Silbermann
*Assistant Examiner* — Daniel Yeagley

(57) ABSTRACT

A steering system has a steering control unit and a ratio adjuster for varying a flow rate amplification ratio of the steering control unit.

10 Claims, 1 Drawing Sheet

U.S. PATENT DOCUMENTS

| | | | |
|---|---|---|---|
| 6,318,078 B1 | 11/2001 | Novacek et al. | |
| 6,782,698 B2 | 8/2004 | Gehlhoff | |
| 2008/0006468 A1* | 1/2008 | Lech et al. | 180/421 |
| 2009/0255750 A1* | 10/2009 | Nakamura et al. | 180/422 |
| 2010/0228439 A1* | 9/2010 | Nakamura et al. | 701/41 |

FOREIGN PATENT DOCUMENTS

| | | |
|---|---|---|
| DE | 4407308 C1 | 8/1995 |
| DE | 19503331 C1 | 8/1996 |
| EP | 0362534 A2 | 4/1990 |

OTHER PUBLICATIONS

Eaton Char-Lynn, Steering Catalog, C-STOV-MC001-E1, Jul. 2006.*

"Controller for Electro-hydraulic Steering PVED," Sauer-Danfoss Operation Manual (102 pages) (Jan. 2004).

"VersaSteer™ Technology Steering Control Units," Eaton Corporation, Mar. 2004 (6 pages).

"Steering: Q-Amp," Eaton Corporation, Sep. 1, 2005 (3 pages).

"New Eaton Steering Control Unit Offers Reduced Installed Costs," Eaton Corporation Press Release, Apr. 23, 2001 (2 pages).

Johan Van Der Kamp, "Electro-hydraulic Steering in Off Road Vehicles," Automation Technology for Off-Road Equipment, Jul. 26, 2002, pp. 374-387, Jul. 26-27 Conf. Proceedings.

Iris Poliski, "Easing the Turn," OEM Off-Highway, pp. 38-39, Sep. 1997.

Alan Hitchcox, "New Cat Tool Carrier Follows the Trends," Hydraulics & Pneumatics, Aug. 10, 2006 (2 pages).

"Section 5 Steering System," Downloaded from Internet on May 16, 2006, pp. 5-1 to 5-13.

"Steering Systems," Copied from the "Background of the Disclosure" Section of U.S. Appl. No. 11/589,459, 1 page, Applicant Admitted Prior Art.

* cited by examiner

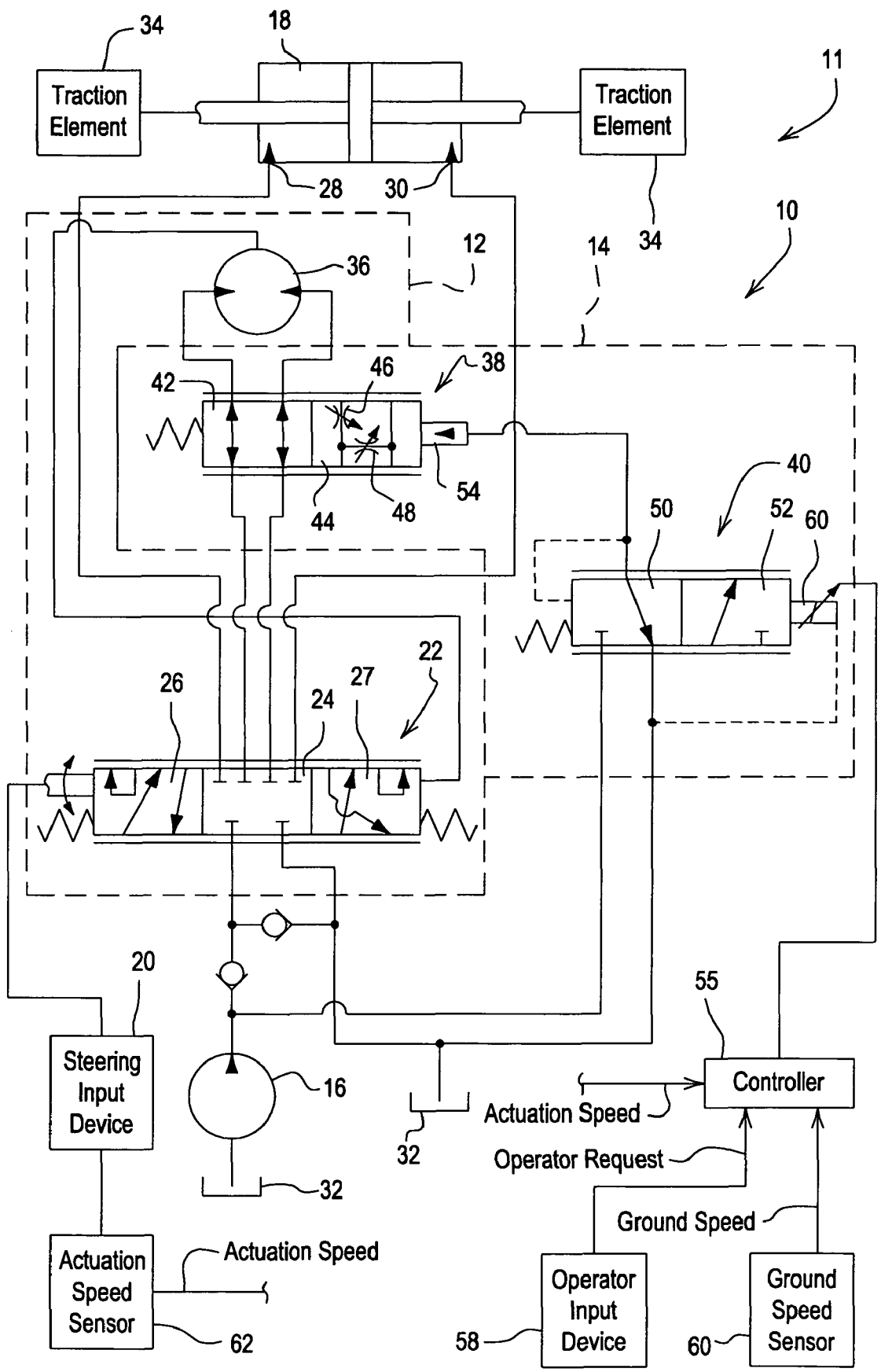

STEERING SYSTEM WITH VARIABLE FLOW RATE AMPLIFICATION RATIO AND ASSOCIATED METHOD

FIELD OF THE DISCLOSURE

The present disclosure relates to steering systems and associated methods.

BACKGROUND OF THE DISCLOSURE

Steering systems have a "steering ratio." The steering ratio is defined as change in the steering output to the wheels or other traction elements of the vehicle with respect to change in the steering input from an operator of the vehicle. A larger steering ratio represents a steering system in which a relatively small steering input (e.g., rotation of a steering wheel, position change of a joystick) results in a relatively large change in the steered position of the steerable traction element(s) whereas a smaller steering ratio represents a steering system in which a relatively large steering input results in a relatively small change in the steered position of the steerable traction element(s).

In the case where the steering system has a steering wheel, the steering wheel will rotate a number of revolutions between a vehicle full-left turn and a vehicle full-right turn (i.e., "full steering articulation"). This number of revolutions is referred to herein as the number of "lock-to-lock turns," the term "lock" referring to each stop (mechanical, electrically programmed, or otherwise) establishing the respective endpoint of the range of motion of the steerable traction element(s). It is to be understood that this number need not be a whole number as it may include some fraction of a revolution.

Some steering systems employ flow rate amplification, which may affect the steering ratio. Flow rate amplification may be represented qualitatively by a flow rate amplification ratio ($Q_{amp}$) of a steering control unit of the steering system according to the equation: $Q_{amp}=Q_{actual}(S\times D)$, wherein $Q_{actual}$ is actual output flow rate of the steering control unit, S is actuation speed of a steering input device, and D is fluid displacement of a fluid meter. A larger flow amplification ratio results in a larger steering ratio and, in the case where the steering input device is a steering wheel, a smaller number of lock-to-lock turns, which may be useful during a "roading" mode in which the vehicle is traveling at higher speeds. On the other hand, a smaller flow amplification ratio results in a smaller steering ratio and, in the case where the steering input device is a steering wheel, a larger number of lock-to-lock turns, which may be useful during a "working" mode in which the vehicle is stationary or traveling at lower speeds.

SUMMARY OF THE DISCLOSURE

According to the present disclosure, there is provided a steering system and an associated method of operating the steering system. The steering system has a steering control unit and a ratio adjuster. The steering control unit comprises a steering input device, a control valve responsive to actuation of the steering input device, and a fluid meter. The steering control unit has a flow rate amplification ratio ($Q_{amp}$) defined such that $Q_{amp}=Q_{actual}/(S\times D)$, wherein $Q_{actual}$ is actual output flow rate of the steering control unit, S is actuation speed of the steering input device, and D is fluid displacement of the fluid meter. The ratio adjuster is configured for varying the flow rate amplification ratio between an upper ratio, a lower ratio, and at least one intermediate ratio intermediate the upper and lower ratios in a manner independent of a displacement setting of the control valve.

The ratio adjuster may be configured for infinite variation of the flow rate amplification ratio within a predetermined range defined between the upper and lower ratios. The ratio adjuster is thus able to relatively precisely establish the flow rate amplification ratio. As such, the steering ratio/number of lock-to-lock turns can be adjusted to a level satisfactory to an operator of the vehicle and/or suitable for different vehicle operating modes, including roading modes at higher vehicle speeds, working modes at lower vehicle speeds, and any number of intermediate modes therebetween.

In an embodiment, the steering control unit is an orbital steering control unit such that the control valve is a deflectable rotary control valve and the fluid meter is a gerotor. Further, the ratio adjuster is configured as a flow control unit positioned fluidly between the rotary control valve and the gerotor for proportionally controlling flow between the rotary control valve and the fluid meter in a manner independent of deflection of the rotary control valve. Exemplarily, the flow control unit comprises a first proportional valve position fluidly between the rotary control valve and the gerotor and a second proportional valve for proportional pilot control of the first proportional valve. The second proportional valve may be under the control of an electronic controller. The second proportional valve may be operated in response to a variety of parameters including, but not limited to, an operator request or ground speed of the work vehicle.

The above and other features will become apparent from the following description and the attached drawings.

BRIEF DESCRIPTION OF THE DRAWINGS

The detailed description of the drawings refers to the accompanying FIGURE showing a hydraulic schematic of a steering system.

DETAILED DESCRIPTION OF THE DRAWINGS

Referring to the FIGURE, there is provided a steering system 10 for a work vehicle 11 such as, for example, an off-highway vehicle (e.g., construction, forestry, agriculture, turf) or other vehicle. The steering system 10 employs flow rate amplification represented by a flow rate amplification ratio ($Q_{amp}$) and is configured for varying the flow rate amplification ratio so as to vary the steering ratio and, where a steering wheel is included, the number of lock-to-lock turns in a relatively precise manner so as to accommodate an operator request and/or accommodate a variety of operating modes of the vehicle such as one or more roading modes, one or more working modes, and one or more intermediate modes between the roading mode(s) and working mode(s).

The steering system 10 has a steering control unit 12 and a ratio adjuster 14. The steering control unit 12 is configured for controlling fluid flow from a source of pressurized fluid 16 (e.g., variable or fixed displacement pump) to a steering actuator 18 (e.g., hydraulic cylinder) in response to actuation of a steering input device 20 (e.g., steering wheel, joystick). The steering control unit 12 defines the flow rate amplification ratio ($Q_{amp}$) such that $Q_{amp}=Q_{actual}/(S\times D)$, wherein $Q_{actual}$ is actual output flow rate of the steering control unit 12, S is actuation speed of the steering input device 20 (e.g., rotation speed of steering wheel), and D is fluid displacement of a fluid meter 36 of the steering control unit 12. Qualitatively, the denominator may be described as the metered flow rate contributed to the actual output flow rate of the steering control unit 12 by the fluid meter 36. The ratio adjuster 14 is configured for varying the flow rate amplification ratio between an upper ratio, a lower ratio, and at least one intermediate ratio intermediate the upper and lower ratios in a manner independent of a displacement setting of a control valve 22 of the steering control unit 12.

The ratio adjuster 14 is configured for varying the flow rate amplification ratio within a predetermined ratio range comprising an upper ratio [e.g., ∞ (i.e., infinity)] and a lower ratio (i.e., 1.0) respectively establishing opposite ends of the predetermined ratio range and at least one intermediate ratio intermediate the upper and lower ratios. Exemplarily, the ratio adjuster 14 may be configured to establish a plurality of intermediate ratios. Further exemplarily, as in the illustrated embodiment and discussed in more detail below, the ratio adjuster 14 may be configured for infinite variation of the flow rate amplification ratio within the predetermined ratio range.

The steering control unit 12 includes a control valve 22. Illustratively, the control valve 22 is of the "closed-center" type such that there is no fluid flow therethrough in its neutral position 24. The control valve 22 further has a first operational position 26 and a second operational position 27. In the first operational position, the control valve 22 is configured to direct fluid supplied by the source of pressurized fluid 16 to a port 28 of the steering actuator 18 and allow return of fluid from a port 30 of the steering actuator 18 to a reservoir 32, thereby turning traction element(s) 34 (e.g., wheels) of the vehicle in a first direction. In the second operational position, the control valve 22 is configured to direct fluid supplied by the source of pressurized fluid 16 to the port 30 and allow return of fluid from the port 28 to the reservoir 32, thereby turning traction element(s) 34 in a second direction opposite to the first direction.

The control valve 22 is yieldably biased to its neutral position and is movable to its two operating positions in response to an input from the steering input device 20. The control valve 22 will open more or less to assume a displacement setting in response to the actuation speed of the steering input device 20.

Exemplarily, the control valve 22 is a deflectable rotary control valve rotatively coupled to the steering input device 20 such that manual actuation of the steering input device 20 (e.g., rotation of a steering wheel, displacement of a joystick) causes proportional rotation of the control valve 22 (i.e., relative proportional rotation, or "deflection," between a spool of the control valve 22 and a sleeve of the control valve 22 disposed about the spool) between the positions 24, 26, 27 of the control valve 22 (note that the two horizontal lines above and below the rectangular box representative of the positions 24, 26, 27 represent such proportional deflection between the spool and sleeve).

The steering control unit 12 includes a fluid meter 36. The fluid meter 36 "measures" the fluid flowing through the steering control unit 12, and imparts follow-up movement to the control valve 22 (e.g., to the sleeve thereof), returning the control valve 22 to its neutral position 24 after the desired amount of fluid has been communicated to the steering actuator 18. The fluid meter 36 is configured, for example, as a gerotor. In such a case, the steering control unit 12 may be referred to as an orbital steering control unit.

In the description of the exemplary, non-limiting embodiment that follows, the steering control unit 12 is configured as an orbital steering control unit such that the control valve 22 is configured as a rotary control valve and the fluid meter 36 is configured as a gerotor.

Illustratively, the ratio adjuster 14 is configured, for example, as a flow control unit positioned fluidly between the rotary control valve 22 and the gerotor 36 for proportionally controlling flow therebetween in a manner independent of the deflection of the control valve 22. Included in the ratio adjuster/flow control unit 14 are a first proportional valve 38 ("variable flow rate amplification valve") and a second proportional valve 40 ("proportional reducing/relieving valve"). The valve 38 is positioned fluidly between the control valve 22 and the gerotor 36 to control fluid flow therebetween and is under the control of the valve 40 for pilot operation thereby.

The valve 38 is movable within a position range including a full-flow position 42, a bypass-flow position 44, and at least one partial-flow position therebetween. Illustratively, the valve 38 is yieldably biased to the full-flow position.

In the full-flow position, the valve 38 allows full fluid flow between the control valve 22 and the gerotor 36. In this condition, a variable size orifice 46 is fully open so that full fluid flow advances therethrough to the gerotor 36 while a variable size orifice 48 is fully closed preventing fluid flow therethrough and thus preventing bypass of the gerotor 36. The full-flow position gives rise to a lower ratio of 1.0.

In the bypass-flow position, the valve 38 prevents fluid flow between the control valve 22 and the gerotor 36 such that the fluid flow bypasses the gerotor 36 on its way to the steering actuator 18. In this condition, the variable size orifice 46 is fully closed preventing fluid flow therethrough to the gerotor 36 while the variable size orifice 48 is fully open so that full fluid flow advances therethrough bypassing the gerotor 36. The fluid displacement of the gerotor 36 thus goes to zero in the bypass-flow condition resulting in an upper ratio of ∞. Of course, the upper ratio may be set at some defined, lower value by allowing a portion of the fluid flow to pass through the gerotor 36.

In each partial-flow position, the valve 38 partially restricts a flow path between the control valve 22 and the gerotor 36, allowing partial fluid flow between the control valve 22 and the gerotor 36. In this condition, both the orifices 46, 48 are partially open (although not necessarily to the same extent) so that part of the fluid flow advances through the orifice 46 to the gerotor 36 and part of the fluid flow advances through the orifice 48 bypassing the gerotor 36. Each partial-flow position gives rise to a distinct intermediate ratio.

Exemplarily, the valve 38 is configured to have a plurality of partial-flow positions, each corresponding to a distinct intermediate ratio. Indeed, in the illustrated embodiment, the valve 38 can be positioned at an infinite number of partial-flow positions between the full-flow and bypass-flow positions, enabling the steering control unit 12 to vary the flow rate amplification ratio infinitely within the predetermined ratio range. Such control over the flow rate amplification ratio enables highly precise control over the steering ratio and thus, when applicable, the number of lock-to-lock turns of the steering wheel.

The second proportional valve 40 is configured for pilot control of the first proportional valve 38. The valve 40 has a position range comprising a neutral, no-pilot position 50, a full-pilot position 52, and at least one partial-pilot position between the no-pilot and full-pilot positions. In the neutral, no-pilot position 50, the valve 40 prevents communication of pressure from the source of pressurized fluid 16 to the pilot section 54 of the valve 38 so that the valve 38 assumes its full-flow position. In the full-pilot position 52, the valve 40 allows full communication of pressure from the source of pressurized fluid 16 to the pilot section 54 so that the valve 38 assumes its bypass-flow position. In each partial-pilot position, the valve 40 allows partial communication of pressure from the source of pressurized fluid 16 to the pilot section 54 so that the valve 38 assumes a corresponding partial-flow position.

Exemplarily, the valve 40 is configured to have a plurality of partial-pilot positions, each corresponding to a distinct partial-flow position of the valve 38. Indeed, in the illustrated embodiment, the valve 40 can be positioned at an infinite number of partial-pilot positions between the no-pilot and full-pilot positions, enabling the steering control unit 12 to vary the flow rate amplification ratio infinitely within the predetermined ratio range. As mentioned above, such control over the flow rate amplification ratio enables highly precise control over the steering ratio and thus, when applicable, the number of lock-to-lock turns of the steering wheel.

The second proportional valve 40 is, for example, an electro-hydraulic valve under the control of an electronic controller 55. As such, the controller 55 may output control signals to the valve 40 commanding the valve 40 (e.g., a solenoid portion 60 of the valve 40 via pulse-width modulation or other suitable control scheme) to assume a corresponding position in response to one or more input signals to the controller 55 so as to control the steering ratio/number of lock-to-lock turns. The controller 55 may be a single controller or a network of controllers connected by a communications bus (e.g., controller area network bus).

The controller 55 may control the valve 40 in response to a variety of inputs or parameters. For example, the controller 55 may monitor output of an operator input device 58 for a request signal representative of a request by the vehicle operator for a selected steering ratio/number of lock-to-lock turns. The operator input device 58 may be, for example, a dial, a slide, a button, a digital input control, or a wide variety of other input devices. The operator may thus manipulate or otherwise actuate the operator input device 58 to select a desired flow rate amplification ratio and associated steering ratio/number of lock-to-lock turns. The controller 55 may then output a control signal commanding operation of the valve 40 and thus the valve 38 to achieve the requested steering ratio/number of lock-to-lock turns.

In another example, the flow rate amplification ratio and corresponding steering ratio/number of lock-to-lock turns may be changed automatically in response to one or more operating parameters. As such, there may be one or more sensors for sensing such operating parameter(s), the output of which is monitored by the controller 55. The controller 55 may then output a control signal commanding operation of the valve 40 so as to automatically set a corresponding flow rate amplification ratio and associated steering ratio/number of lock-to-lock turns.

Exemplarily, the controller 55 may be responsive to ground speed of the vehicle 11 for automatic control of the flow rate amplification ratio and associated steering ratio/number of lock-to-lock turns. In such a case, there may be a ground speed sensor 60 for sensing the ground speed of the vehicle 11. The controller 55 may monitor output of the ground speed sensor 60 for a ground speed signal representative of the vehicle ground speed and then output a control signal commanding operation of the valve 40 and thus the valve 38 to achieve a predetermined flow amplification ratio and associated steering ratio/number of lock-to-lock turns corresponding to the ground speed. The controller 55 may employ a look-up table, map, equation, or other scheme programmed into the controller 55 to determine the control signal for commanding the valve 40.

The vehicle 11 may be configured to allow the operator to select either a manual control mode or an automatic control mode for control of the amplification ratio and steering ratio/number of lock-to-lock turns. In such a case, in the manual control mode, the controller 55 would be responsive to the request signal from the operator input device 58. In the automatic control mode, the controller 55 would be responsive to the signals representative of the one or more sensed operating parameter(s) (e.g., ground speed signal representative of ground speed sensed by ground speed sensor 60).

The controller 55 may also be responsive to the actuation speed of the steering input device 20 (e.g., rotation speed of a steering wheel) to control the valve 40 and thus the steering ratio/number of lock-to-lock turns. As such, the controller 55 may monitor an actuation speed sensor 62 for the actuation speed. This actuation speed input may be in addition to the operator request, the ground speed, or other parameter inputted into the controller 55.

It should be understood that, instead of being electro-hydraulic, the second proportional valve 40 may be configured in other ways, such as fully hydraulic so as to be responsive to hydraulic command signals.

In use, the controller 55 positions the valve 40 so as to establish a particular flow rate amplification ratio within the ratio range to achieve a suitable steering ratio/number of lock-to-lock turns. When the controller 55 positions the valve 40 in the no-pilot position, the valve 40 pilots the valve 38 to assume the full-flow position advancing full flow to the gerotor 36 so as to be metered thereby establishing a minimum flow rate amplification ratio within the ratio range, thereby minimizing the steering ratio and, in the case of a steering wheel, maximizing the number of lock-to-lock turns.

When the controller 55 positions the valve 40 in the full-pilot position, the valve 40 pilots the valve 38 to assume the bypass-flow position preventing fluid flow to the gerotor 36 so as to bypass the gerotor 36 establishing a maximum flow rate amplification ratio (e.g., $\infty$) within the ratio range, thereby maximizing the steering ratio and, in the case of a steering wheel, minimizing the number of lock-to-lock turns.

When the controller 55 positions the valve 40 in one of the partial-pilot positions, the valve 40 pilots the valve 38 to assume a corresponding partial-flow position so that some fluid flows to the gerotor 36 so as to be metered thereby on its way to the steering actuator 18 while the rest of the fluid bypasses the gerotor 36 on its way to the steering actuator 18. This establishes one of the intermediate ratios within the ratio range so that a relatively precise steering ratio/number of lock-to-lock turns can be obtained. Moreover, in the illustrated embodiment, the controller 55 can vary the position of the valve 40 infinitely within a position range so as to vary the position of the valve 38 infinitely within its position range, correspondingly varying the flow rate amplification ratio infinitely within the ratio range for even more precise control over the steering ratio/number of lock-to-lock turns.

While the disclosure has been illustrated and described in detail in the drawing and foregoing description, such an illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A steering system, comprising:
    an orbital steering control unit comprising a deflectable rotary control valve and a gerotor for imparting follow-up movement to the rotary control valve, and a flow control unit positioned fluidly between the rotary control valve and the gerotor for proportionally controlling flow between the rotary control valve and the gerotor in a manner independent of deflection of the rotary control valve, wherein the flow control unit comprises a first proportional valve positioned fluidly between the rotary control valve and the gerotor, wherein the first proportional valve comprises a first variable size orifice for communicating fluid between the rotary control valve and the gerotor and a second variable size orifice arranged for fluid bypass of the gerotor.

2. The steering system of claim 1, wherein the flow control unit comprises a second proportional valve for proportional pilot control of the first proportional valve.

3. The steering system of claim 2, wherein the first proportional valve is movable between a full-flow position allowing full fluid flow between the rotary control valve and the gerotor, a bypass-flow position preventing fluid flow between the rotary control valve and the gerotor, and at least one partial-flow position allowing partial fluid flow between the rotary control valve and the gerotor, and the second proportional valve is fluidly coupled to the first proportional valve to pilot the first proportional valve between the full-flow, bypass-flow, and partial-flow positions.

4. The steering system of claim 1, further comprising an electronic controller configured to command operation of the flow control unit.

5. The steering system of claim 1, wherein the steering system is configured to operate the flow control unit in response to an operator request.

6. The steering system of claim 1, wherein the steering system is configured to operate the flow control unit in response to ground speed of a work vehicle comprising the steering system.

7. A work vehicle comprising the steering system of claim 1.

8. A steering system, comprising:
a steering control unit comprising a steering input device, a control valve responsive to actuation of the steering input device, and a fluid meter, the steering control unit having a flow rate amplification ratio ($Q_{amp}$) defined such that $Q_{amp}=Q_{actual}/(S \times D)$, wherein $Q_{actual}$ is actual output flow rate of the steering control unit, S is actuation speed of the steering input device, and D is fluid displacement of the fluid meter, and
a ratio adjuster positioned fluidly between the control valve and the fluid meter for varying the flow rate amplification ratio between an upper ratio, a lower ratio, and at least one intermediate ratio intermediate the upper and lower ratios in a manner independent of a displacement setting of the control valve, wherein the ratio adjuster comprises a first proportional valve positioned fluidly between the control valve and the fluid meter, wherein the first proportional valve comprises a first variable size orifice for communicating fluid between the control valve and the fluid meter and a second variable size orifice arranged for fluid bypass of the fluid meter.

9. The steering system of claim 8, wherein the ratio adjuster comprises an electro-hydraulic second proportional valve for proportional pilot control of the first proportional valve.

10. The steering system of claim 8, wherein the ratio adjuster is configured for infinitely varying the flow rate amplification ratio in a manner independent of the displacement setting of the control valve.

* * * * *